March 21, 1967     M. STANLEY     3,310,339

ARMREST FOR AUTOMOTIVE VEHICLES

Filed Feb. 9, 1965

INVENTOR.
MONTE STANLEY
BY
Barnes, Kisselle, Raisch & Choate
ATTORNEYS

United States Patent Office 3,310,339
Patented Mar. 21, 1967

3,310,339
ARMREST FOR AUTOMOTIVE VEHICLES
Monte Stanley, 14545 Rosemont, Detroit, Mich. 48223
Filed Feb. 9, 1965, Ser. No. 431,349
3 Claims. (Cl. 296—153)

This invention relates to armrests for the window openings of automotive vehicles.

In driving automotive vehicles and particularly trucks and the like, it is common practice for the operator to rest his arm on the window ledge when the window is retracted. Such window openings are defined in the door by inner and outer metal sections which form a channel out of which the window is projected to close the window opening and into which the window is projected to open the window opening. In order to present minimum discomfort to the driver and prevent undue wear on the clothing of the driver, it is desirable to provide an armrest of some type in the window opening.

It is therefore an object of this invention to provide an armrest which can be readily placed in the window opening to produce the desired comfort and protection of the arm of the operator and at the same time will be firmly held in position but which can be readily removed when desired to permit the window to be closed.

Figure 1:
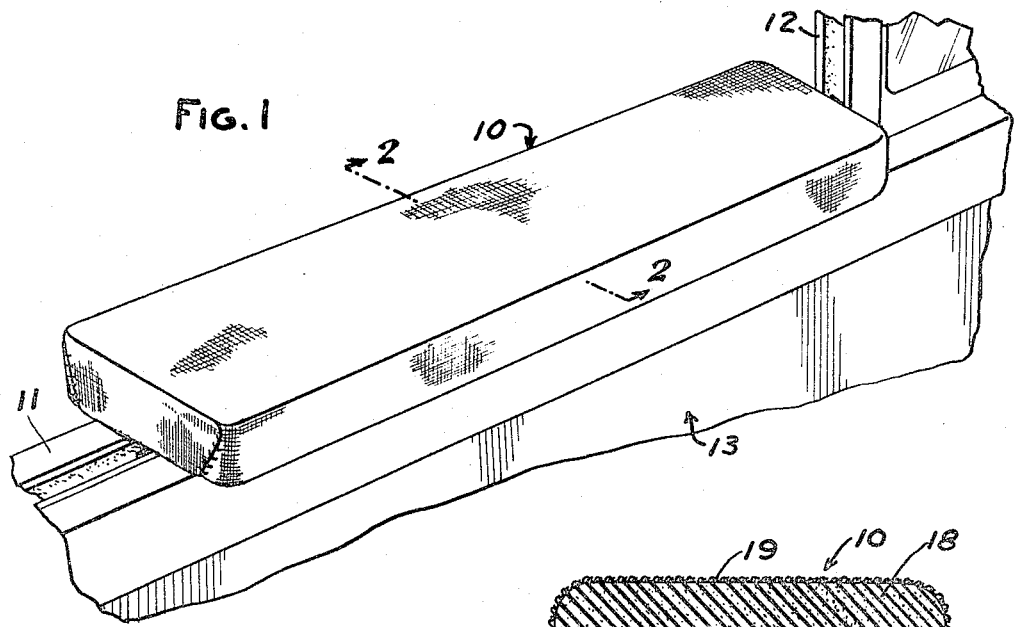
FIG. 1 is a fragmentary perspective view of an armrest embodying the invention in position in the window opening of a vehicle door.
Figure 2:
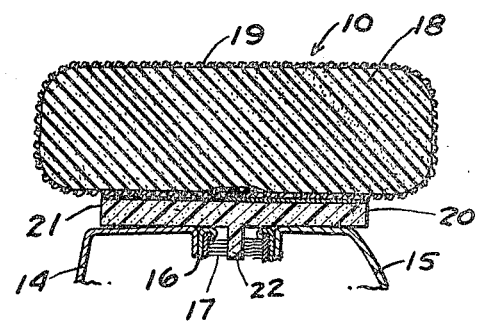
FIG. 2 is a fragmentary sectional view on an enlarged scale taken along the line 2—2 in FIG. 1.

Referring to FIG. 1, armrest 10 embodying the invention is adapted to be positioned on window ledge 11 formed at the side of window opening 12 in car door 13. As shown in FIG. 2, the car door 13 generally comprises inner and outer metal panels or sections 14, 15 that are spaced from one another to define a generally vertical channel 16 into which the window is retracted and out of which the window is elevated to open and close the window opening 12. The channel 16 generally includes weather stripping 17.

In accordance with the invention, the armrest 10 comprises a pad 18 of foam rubber or similar material, which is preferably weatherproof, covered with a cloth or plastic covering 19. The pad 18 is generally rectangular and of uniform thickness with rounded corners. A thin sheet metal member 20 is connected to the underside of the pad 18 by adhesive or other suitable means.

Figure 3:
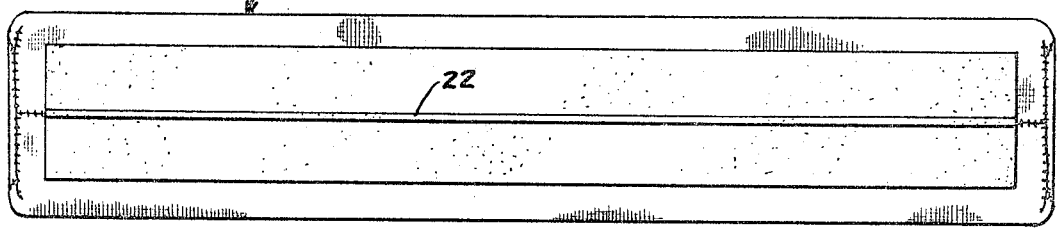
FIG. 3 is a bottom plan view of the armrest shown in FIGS. 1 and 2.

In turn, a magnet 21 of substantially uniform thickness is adhered by adhesive to the underside of the sheet metal member 20. As shown in FIG. 3, the magnet extends substantially throughout the length of the sheet metal member 20; but the member 20 preferably extends longitudinally and transversely beyond the extremities of the magnet 21 substantially to the periphery of the pad 18. The magnet 21 includes a downwardly extending projection or lip 22 generally centrally thereof that is adapted to extend into the channel 16 of the door and thereby provide a mechanical obstacle which prevents lateral movement of the armrest. Thus the armrest 10 is held in position by magnetic action between the metal sections 14, 15 of the door and the mechanical abutment of the lip 22 with the sides of the channel 16 that prevent the armrest from being removed laterally.

Figure 4:
FIGURE 4 is a sectional view of the magnet.

The magnet 20 is preferably made of flexible magnetic material such as is commonly made of a thermoplastic binder and magnetized particles such as barium ferrite. The magnet is preferably extruded in the T-shaped cross section shown in FIG. 2. Such a material is presently made of the B.F. Goodrich Company of Marietta, Ohio. As shown in FIG. 4, the magnet preferably has the North and South poles at the extremities of the undersurface of the magnet.

The use of such a magnet permits the pad to conform to slight curvatures or deviations from a flat plane as are commonly found on the ledge 11 of a window opening.

In use, the armrest can be readily applied to the ledge 11 of the window opening and will be held in position by the combined magnetic and mechanical action. The armrest can be readily removed when it is desired or moved longitudinally of the vehicle door to provide the desired support for the arm of the operator. Upon lifting, the armrest is quickly removed to permit the window to be closed.

I claim:

1. In an armrest for the window opening of an automotive vehicle wherein a window is moved into and out of the opening to close and open the window, the combination comprising
   a pad of generally elongated construtcion,
   a magnet mounted on the underside of the pad and extending substantially along the entire length thereof,
   said magnet being generally T-shaped in cross section,
   said magnet having a downwardly extending lip portion which is adapted to project between the sections of a door which define the channel into which the window moves,
   said magnet thereby performing the dual function of holding the pad against the door and preventing lateral motion of the pad by engagement of the lip portion with the sides of the channel.

2. In an armrest for the window opening of an automotive vehicle wherein a window is moved into and out of the opening to close and open the window, the combination comprising
   a pad of generally elongated construction,
   a magnet mounted on the underside of the pad and extending substantially along the entire length thereof,
   said magnet having a downwardly extending lip portion which is adapted to project between the sections of a door which define the channel into which the window moves,
   said magnet thereby performing the dual function of holding the pad against the door and preventing lateral motion of the pad by engagement of the lip portion with the sides of the channel,
   and a substantially uniformly thick sheet metal member interposed between said magnet and said pad,
   means connecting said metal to said pad,
   and means connecting said metal to said magnet.

3. In an armrest for the window opening of an automotive vehicle wherein a window is moved into and out of the opening to close and open the window, the combination comprising
   a pad of generally elongated construction,
   a magnet of flexible magnetic material mounted on the underside of the pad and having a substantially flat portion extending substantially along the entire length thereof,
   said magnet having an integral downwardly extending lip portion which is adapted to project between the sections of the door which define the channel into which the window moves,
   said magnet thereby performing the dual function of holding the pad against the door and preventing lateral motion of the pad by engagement of the lip portion with the sides of the channel, and a substantially uniformly thick sheet metal member interposed between said magnet and said pad, means connecting said metal to said pad, and means connecting said metal to said magnet, said sheet metal member being substantially coextensive with said pad and having a portion thereof projecting beyond the periphery of said flat portion of said magnet.

References Cited by the Examiner

UNITED STATES PATENTS

| | | | |
|---|---|---|---|
| 2,803,493 | 8/1957 | Haefliger | 296—153 |
| 3,129,974 | 4/1964 | Carter | 296—153 |

MILTON BUCHLER, *Primary Examiner.*

BENJAMIN HERSH, *Examiner.*

P. GOODMAN, *Assistant Examiner.*